Patented Jan. 6, 1953

UNITED STATES PATENT OFFICE 2,624,692

METHOD OF MAINTAINING MICROORGANISMS IN A VIABLE STATE

William L. Owen, Baton Rouge, La.

No Drawing. Application September 6, 1949, Serial No. 114,279

12 Claims. (Cl. 195—98)

The present invention relates to the preservation of microbial cultures in a viable state.

It may be stated that microbial cultures of various kinds, including bacteria cultures of yeast and molds are usually preserved and distributed in the form of agar streak cultures, although yeast is frequently preserved in a liquid substrate.

The objections to agar streak cultures are, first, the agar dehydrates very rapidly and the cultures become desiccated, and even where desiccation does not occur it frequently requires at least two to three transfers to develop a sufficient volume of culture as, for example, a sufficient volume of active yeast to initiate plant fermentation.

Further, the procedure for the preparation of liquid suspensions of cultures has usually comprised the recovery of concentrated bacteria or cells as, for example, yeast cells from molasses or malt mashes, and the addition of the concentrated yeast cells to mashes of molasses or malt suitably enriched. While these cultures remain in a viable state or condition over a period of several months, the viability of the cells is greatly reduced within this period due to the action of the salts present in the mash upon the yeast cells.

It has been discovered that the viability of micro-organisms can be maintained in a liquid substrate of sugar which is unfermentable by the micro-organism, the sugar solution being slightly under the saturation point of the aqueous solution for sugar. The presence of sugar in the aqueous solution at maximum concentration of solubility tends to increase the osmotic value of the sugar solution, to thereby partially dehydrate the micro-organisms as, for example, yeast cells, and, more over, at the concentration just slightly under the saturation point, the susceptibility of the solution to bacterial contamination is reduced to a minimum. A further advantage of this procedure is that the micro-organisms in contact with the substrate of a sugar solution in which the micro-organism is unfermentable, said sugar soution being at slightly less than the saturation point for the particular sugar used for preservation, remain in a viable condition and induce fermentation after being added to the malt or mash to be fermented within a very brief period as compared to that which may be necessary when the yeast has been preserved in agar slants and added to the malt or mash to be fermented.

An illustrative sugar solution suitable for the preservation of Saccharomyces cerevisiae species is a solution of lactose, the latter being soluble in water to the extent of 1 gram in 4.9 cc. of water. It is desirable that the sugar used as the preservative ingredient be soluble in water to the extent that even if slight fermentation ability be acquired by the micro-organism as, for example, the yeast, the concentration of the sugar in solution will be at limits above the levels at which fermentation, even under these circumstances, may occur.

It is an object of the present invention to provide a preformed preparation comprising microorganisms, including yeast cells, suspended in a sugar solution, said micro-organisms being unfermentable in the sugar solution.

It is an additional object of the present invention to provide a sealed container containing said preparation, the viability of the preparation being capable substantially of being permanently maintained in a viable state. It is a further object of the present invention to provide a preparation of the character set forth, the substrate of said preparation having substantially the same density level or one closely adjacent to the density level of the medium to be fermented.

It is another object of the present invention to provide a preformed preparation comprising bacteria suspended in a sugar solution in which the micro-organisms are unfermentable to thereby preserve the viability of the bacteria, the surface of the suspension or substrate being protected from mold growths by an inert layer of an oil, said oil preferably being a mineral oil including a petroleum oil.

It is also an object of the present invention to provide a preformed suspension or substrate above set forth with an oil layer which has in admixture therewith an oil which has antiseptic value and which has the property of reducing the rate of oxidation of the viable micro-organisms while they are in a dormant state in the sugar solution, said secondary oil being preferably oil of cloves.

It is also an object of the present invention to provide a preformed preparation of the character set forth which may be provided in the sealed container, said preparation having incorporated therein, below the surface of the substrate, a fungicide which inhibits the growth of molds below the surface of the suspension.

The following example is illustrative of the present invention:

EXAMPLE

A culture upon an agar slant of a distillery yeast (Saccharomyces cerevisiae species) is inoculated into a 10 cc. tube of a sterile molasses mash of 15° Brix density, said mash being enriched with 1 gram of ammonium sulphate per liter and acidified with 1 cc. of sulphuric acid per liter. A number of tubes of sterile molasses mash are processed as above set forth, each of said tubes being inoculated with distillery yeast. At the end of 24 hours, after the contents of the tubes are vigorously fermented, the fermented mass is transferred to a flask of 200 cc. of sterile molasses mash enriched with ammonium sulphate and sulphuric acid. At the end of a further period of 24 hours the contents of the flask are added to 500 cc. of a mash consisting of 250 cc.

of a 4° Brix molasses mash and a similar volume of a 4° Brix malt mash. The resulting mash is placed in a two liter flask provided with a Carborundum sparger and aerated. While the mash is being aerated as above described, 100 cc. of a 20° Brix mash are added incrementally through a separatory funnel and 10 cc. of a 10% ammonium sulphate solution and 10 cc. of ammonium hydroxide are added simultaneously with the added mash. The rate of addition of the fresh mash and the enrichment material is determined by the rate of attenuation of the aerated mash, as a result of the utilization of sugar by the yeast. After 12 hours of vigorous aeration, the yeast cell concentration reaches its maximum and the yeast is allowed to settle from the mash under refrigeration conditions of temperatures below 40° F., the temperature usually varying between 15° F. and 40° F. After the yeast is completely settled out, the supernatant liquid is decanted through a sterile syphon, and the yeast solutions are added to a sterile solution of 16% lactose in water. The material is then introduced into a bottle and a fungicide in the proportion of about 1 to 10,000 is added to prevent mold growth, the preferred fungicide being diphenyl. There is then added to the preparation in the sterile bottle a layer of sterile mineral oil of a depth between about one-quarter of an inch and about one inch. The thickness of the oil layer is not critical since its function is to trap any microorganisms that may gain access to the contents of the bottle. In some experiments, it has been discovered that there is a development of mold fungi within the oil layer. It has been ascertained that the development of mold fungi can be prevented by mixing with the mineral oil layer an oil which is miscible with the mineral oil or the equivalent oil used and which has an antiseptic action inhibiting the development of mold growth. Excellent results have been obtained by adding to the mineral oil 5 to 15% of oil of cloves, said percentages being based on the weight of the mineral oil. The best results have been obtained when using about 10% of oil of cloves. This secondary oil which is added to the mineral oil or its equivalent produces, in conjunction with the mineral oil, an oil layer in which the growth of fungi in the oil layer at the surface of the yeast suspension is inhibited. The amount of secondary oil may be greatly varied and said percentages are illustrative and not by way of limitation.

A preparation prepared according to the above example and maintained in a sealed bottle was kept at room temperature at approximately 85° to 90° for a number of weeks and tests of the preparation were made each week by withdrawing 1 cc. of the material into a sterile pipette and inoculating sterile molasses mash tubes with the withdrawal specimen. The following table sets forth the results obtained:

*Table*

| Age of Culture, Weeks | Amount of Inoculum | Contents of Tubes | Time required to Induce Fermentation |
|---|---|---|---|
| | Cc. | Cc. | Hours |
| 1 | 1 | 10 | 12 |
| 2 | 1 | 10 | 12 |
| 3 | 1 | 10 | 12 |
| 4 | 1 | 10 | 12 |
| 5 | 1 | 10 | 12 |
| 6 | 1 | 10 | 12 |
| 7 | 1 | 10 | 12 |
| 8 | 1 | 10 | 12 |

At the end of three months a test was made of the efficiency of the above-described yeast preparation as compared to an agar slant containing comparable yeast cells. The efficiency results are as follows:

Efficiency of agar slant, yeast S90 _____ 94.2
Efficiency of bottled preparation _____ 94.3

The above conclusively shows that even at room temperature yeast preparations can be preserved in a highly viable and active condition by any substrate of a concentration of sugars unfermentable by the particular yeast being preserved at slightly below the saturation point of the aqueous sugar solution. In the above example the lactose was unfermentable and was used in a concentration of 16 or 16.5%. The lactose solution is an excellent preserver of the yeast and at the concentration is very insusceptible to the growth of bacteria and/or molds. This is one of the advantages of using a dilute sugar solution at concentrations between about 8% and 20% and preferably between about 10% and about 20%. The above concentrations are by volume.

The present invention is highly advantageous in that it provides for a high concentration of yeast cells as, for example, a cell concentration of 100 million to 200 million per cc., said solution being in a very active condition and for the first time enables the distillery fermentologist to introduce the contents of a bottle of concentrated viable cells preserved at substantially their maximum viability into the pure culture apparatus. In the process formerly employed, the suspension of the yeast cells which was introduced into the pure culture apparatus contained large amounts of other material and other solids in the presence of sucrose and these resulted in a long lag phase before the yeast cells became active. In other words, after the introduction of the suspension of yeast cells into the pure culture apparatus, the dehydrated yeast cells had a period of fermentation inactivity well known as the "lag period" before the yeast cells became active in fermenting the mash to which it was added. The preparation of the present invention provides yeast cells suspended in an unfermentable sugar solution at slightly below its saturation point, said yeast cells being as active in fermenting the mash to which they are added as though the solution has been freshly grown in a 24-hour agar slant.

At this point it is desired to point out that applicant's contribution also resides in the preparation of the preparation of the character set forth which can be stored for indefinite periods, as for a month, two months, three months, four months or even six months, said preparation having the advantage that the viability of the cells are substantially unimpaired even though the yeast suspension is kept at room temperature for an indefinite period of time.

While the invention has been illustrated in connection with *Saccharomyces cerevisiae* species, the invention may be applied to the yeast and pseudo-yeasts or Torulae. Distilleries and breweries use yeasts in this form and the false yeasts, or Torulae, and especially *Torula utilis*, are included within the scope of the present invention, the *Torula utilis* being used in the preparation of feed or food yeast.

It is again pointed out that the sugar solution in which the microorganism is unfermentable functions to increase the osmotic value of the substrate so as to partially dehydrate the protoplasm of the cells to be preserved and act as an inhibitor of the active growth of any contaminant which may gain access to the container in which the preparation is stored.

The preformed preparation comprising microorganisms including yeast cells suspended in a sugar solution of the character herein set forth has generally substantially the same density level as the density level of the medium to be fermented. It may be stated that almost all fermentation mashes have a density varying between about 15 to 25 Brix or per cent solids. Stated somewhat differently, the preformed preparation of the micro-organism in the sugar solution used for the preservation of the cultures has a density comparable to the mash to which the preformed preparation is eventually added to function as a fermentation agent. For example, yeast culture as herein previously set forth is preserved in a 20% solution of lactose. This suspension of yeast may be transferred to a solution of molasses or grain having approximately the same density or densities which are adjacent to one another and do not vary by more than 10% to 15%.

What is claimed is:

1. The method of maintaining yeast of the species *Saccharomyces cerevisiae* in a viable state comprising suspending the yeast in an aqueous solution of lastose substantially incapable of being fermented by said yeast, said solution being a dilute solution unsaturated with respect to its sugar content.

2. The method comprising suspending yeast of the species *Saccharomyces cerevisiae* in a dilute aqueous solution containing between 10% and about 20% of lactose which maintains said yeast in a viable state for indefinite periods of time, said suspension having a predetermined density, and incorporating said preparation in a material to be fermented which has a density within 10% to 15% of the density of the preparation containing the yeast.

3. The method of maintaining yeast of the species *Saccharomyces cerevisiae* in a viable state comprising suspending the yeast in a dilute aqueous unsaturated solution of lactose in which the yeast is unfermentable, said aqueous suspension containing on its surface a sterile layer of oil to protect the surface of the suspension against the growth of contaminating mold fungi.

4. The method of maintaining yeast of the species *Saccharomyces cerevisiae* in a viable state comprising suspending the yeast in a dilute aqueous unsaturated solution of lactose in which the yeast is unfermentable, said aqueous suspension containing on its surface a sterile layer of oil in admixture with oil of cloves to protect the surface of the suspension against the growth of contaminating mold fungi.

5. The method of maintaining yeast of the species *Saccharomyces cerevisiae* in a viable state comprising suspending the yeast in an aqueous solution containing between about 10% and about 20% of lactose.

6. The method of maintaining yeast of the species *Saccharomyces cerevisiae* in a viable state comprising suspending said yeast in an aqueous solution of lactose containing between about 10% and 20% of lactose in which the yeast is unfermentable, said aqueous solution containing a fungicide miscible with said solution to inhibit the growth of mold fungi beneath the surface of the suspension.

7. The method of maintaing yeast of the species *Saccharomyces cerevisiae* in a viable state comprising suspending said yeast in an aqueous solution of lactose having a concentration less than the saturation point for lactose and above the concentration level at which any fermentation of the yeast occurs.

8. The method of maintaining yeast of the species *Saccharomyces cerevisiae* in a viable state comprising suspending said yeast in an aqueous solution of lactose containing between about 10% and 20% of lactose in which the yeast is unfermentable, said aqueous solution containing diphenyl to inhibit the growth of mold fungi beneath the surface of the suspension.

9. The method of maintaining yeast of the species *Saccharomyces cerevisiae* in a viable state comprising suspending said yeast in an aqueous solution containing between about 10% and about 20% of lactose, the resulting aqueous suspension containing on its surface a sterile layer of oil to protect the surface of the aqueous suspension against the growth of contaminating mold fungi.

10. The method of maintaining yeast of the species *Saccharomyces cerevisiae* in a viable state comprising suspending said yeast in an aqueous solution containing between about 10% and about 20% of lactose, the resulting aqueous suspension containing on its surface a sterile layer of oil in admixture with oil of cloves to protect the suspension against the growth of contaminating fungi.

11. The method of maintaining yeast of the species *Saccharomyces cerevisiae* in a viable state comprising suspending said yeast in an aqueous solution containing between about 10% and about 20% of lactose, the resulting aqueous suspension containing on its surface a layer of oil in admixture with oil of cloves, the composite oil layer containing between about 5% and about 15% of oil of cloves, said percentage being taken by volume on the composite oil layer.

12. The method of maintaining yeast of the species *Saccharomyces cerevisiae* in a viable state comprising suspending said yeast in an aqueous solution containing about 16% of lactose.

WILLIAM L. OWEN.

REFERENCES CITED

The following references are of record in the file of this patent:

UNITED STATES PATENTS

| Number | Name | Date |
| --- | --- | --- |
| 1,934,941 | Mizobata | Nov. 17, 1933 |

OTHER REFERENCES

Guilliermond: The Yeasts, 1920, John Wiley and Sons, Inc., pp. 61-62, 64.

Jorgensen: Microorganisms and Fermentations, Charles Griffin and Co., Ltd., London, 1948, pp. 164-165.

Gershenfeld, Bacteriology, Mack Pub. Co., 1945, page 74.